United States Patent [15] 3,679,973
Smith, Jr. et al. [45] July 25, 1972

[54] ELECTROGASDYNAMIC DUST MONITOR

[72] Inventors: Nelson S. Smith, Jr.; George E. Fasching, both of Morgantown, W. Va.

[73] Assignee: The United States of America as represented by the Secretary of the Interior

[22] Filed: Oct. 20, 1970

[21] Appl. No.: 82,288

[52] U.S. Cl. .............................324/71 R, 324/32, 324/33, 73/432 PS, 73/28, 73/194 F, 55/138, 55/139
[51] Int. Cl. .......................................G01n 27/00
[58] Field of Search..............324/32, 33, 71 CP; 73/432 PS, 73/194 F, 28, 17 OR; 250/41.9 D; 209/127 R; 55/136–139; 250/43.5 MR, 83.6 FT; 340/237 S

[56] References Cited

UNITED STATES PATENTS

| | | | |
|---|---|---|---|
| 3,289,003 | 11/1966 | Jorgenson | 324/71 CP |
| 3,262,106 | 7/1966 | Crawford | 340/237 S |
| 3,449,667 | 6/1969 | Gourdine | 324/33 |

Primary Examiner—Michael J. Lynch
Attorney—Ernest S. Cohen and Albert A. Kashinski

[57] ABSTRACT

Size and flow rate of dust particles entrained in a flowing gas stream are measured by an electrogasdynamic dust monitor. A multiple segment collector section generates currents with interdependent values related to dust properties.

9 Claims, 2 Drawing Figures

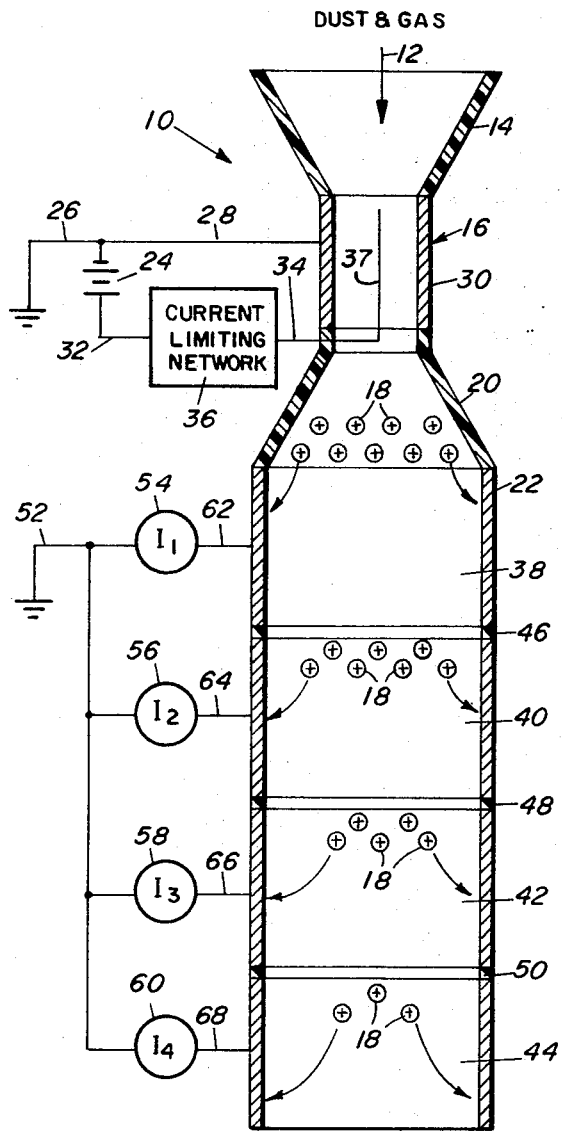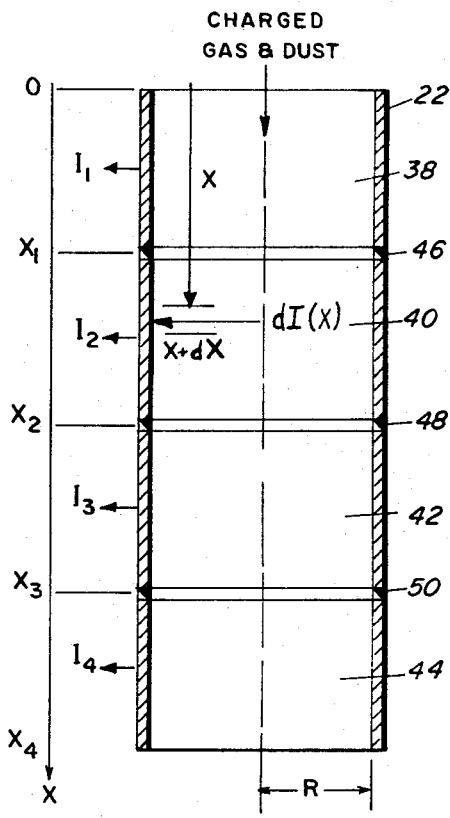
FIG.1
FIG.2
INVENTORS
NELSON S. SMITH, JR.
GEORGE E. FASCHING
BY
ATTORNEYS

ELECTROGASDYNAMIC DUST MONITOR

BACKGROUND OF THE INVENTION

In air pollution control, precision monitoring of solid and gaseous wastes has become increasingly important. For example, smokestack emissions often contain both gaseous pollutants and particulate fly ash. Effective pollution control requires surveillance of not only the gaseous, but also the particulate pollutants.

Prior systems for detecting particulate emissions have included electrogasdynamic (EGD) methods and apparatus. One such system is described in U. S. Pat. No. 3,449,667. By measuring the amount of charge carried by a particulate stream from an ionizer to a single collector, the EGD system of the patent determines particle characteristics. Based upon a novel mathematical theory, our invention employs a collector with multiple segments rather than a single segment, yielding results that were not obtainable by the prior art system.

SUMMARY OF THE INVENTION

This invention is an electrogasdynamic (EGD) dust monitor for measuring the size and flow rate of particles suspended in a flowing gas stream. A flowing mixture of gas and dust particles enters the monitor through a constricting nozzle. The mixture is accelerated in an ionizer section while the suspended particles receive a unipolar charge. After deceleration, the mixture flows through a segmented collector section where individual particles discharge on one or another of the electrically independent collector segments. By measuring the rate at which charge is deposited on each segment, the particle size and flow rate are determined.

Operation of the EGD dust monitor is based upon an extension of EGD principles developed in the prior art. In *Industrial and Engineering Chemistry*, December, 1966, on pages 26–29 in an article titled "Electrogasdynamics and Pricipitation," E. L. Collier, et al, derive basic mathematical expressions of electrogasdynamic operation. One such expression relates the relative charge densities at the inlet and the outlet of an EGD collector. An expansion of this expression shows that additional information about the particulate is obtained from multiple collectors used in series. The specific expressions of this relationship are derived below.

Therefore, one object of this invention is an EGD dust monitor with a multiple segment collector.

Another object of this invention is a method for measuring the size and flow rate of particles suspended in a gas stream.

Another object of this invention is a method for monitoring particle size and flow rate by reference to multiple collector currents generated by an EGD system.

These and other objects of the invention are apparent in the following specification and drawing.

BRIEF DESCRIPTION OF THE DRAWING

FIG. 1 is a cross-sectional view of an EGD dust monitor.

FIG. 2 is a cross-sectional view of the segmented collector section shown in FIG. 1.

DESCRIPTION OF THE PREFERRED EMBODIMENT

An electrogasdynamic (EGD) dust monitor 10 is shown in FIG. 1. A mixture of gas and dust particles, flowing in the direction of arrow 12, enters the monitor through a conical, dielectric, nozzle section 14 where it is constricted and accelerated to a high velocity. The accelerated mixture passes through a cylindrical ionizer section 16 where the dust particles 18 receive a positive electrical space charge. Leaving the ionizer section, the mixture enters a conical, dielectric, diffusing section 20 where the axial velocity is reduced to permit radial particle velocities of the same magnitude as the axial velocity. Finally, the mixture enters a segmented, cylindrical, collector section 22 where the space charge of the particles 18 causes them to migrate to the collector segment walls. By measuring the time rate at which charge is deposited by the stream of particles on each collector segment, both the size and mass flow of the particles are determined.

Electrical potential for charging particles 18 within the ionizer section 16 is derived from a high voltage source 24. The negative terminal of the source is grounded by a conductor 26 and is connected, by a conductor 28, to a cylindrical electrode 30, which forms the outer wall of the ionizer section. The positive terminal is connected, by two conductors 32–34 and an intermediate current limiting network 36, to a bare, wire filament electrode 37, aligned axially within electrode 30. In operation, high voltage source 24, in association with current limiting network 36, supplies a current on the order of several hundred microamperes to the ionizer electrodes, holding the voltage level across the electrodes at a value on the order of several kilovolts. As they flow through the high voltage field of the ionizer section, dust particles 18 within the gaseous stream take on a positive charge. The quantity of this charge is measured in the collector section 22.

Collector section 22 is a segmented cylinder with alternate conducting segments 38–44 and insulating segments 46–50. At one end of the collector section, conducting segment 38 adjoins the broad end of diffusing section 20, and on the other end conducting segment 44 adjoins a discharge flue (not shown). Each of the four conducting segments 38–44 is grounded by a conductor 52 through an intermediate ammeter 54–60 and conductors 62–68, respectively. As the charged particles strike the collector segment walls their charge is neutralized, causing a potential difference between the segments and ground. The resulting current flow $I_1$–$I_4$ between each conducting segment and ground is indicated by ammeters 54–60. These currents values are used to complete a set of mathematical equations from which particle size and mass flow data are determined by routine computations. The derivation and use of the equations is explained below.

In describing the theoretical and mathematical aspects of EGD dust monitor 10, the flowing nomenclature is used:

| Symbol | Definition and units |
| --- | --- |
| $a$ | Particle radius, meters |
| $C_1, C_2, C_3, C_4$ | Constants |
| $d$ | Particle density, kilograms/meters$^3$ |
| $e$ | Electronic charge, coulombs |
| $E_c$ | Ionizing electric field, volts/meter |
| $E_R$ | Electric field at collector wall, volts/meter |
| $I_i$ | Electric current at $i^{th}$ segment, amperes |
| $K_j$ | Particle mobility, meter$^2$/volt-second |
| $L$ | Collector length, meters |
| $n_j(L)$ | Numerical charge density at $x = L$, meter$^{-3}$ |
| $n_j(o)$ | Numerical charge density at $x = o$, meter$^{-3}$ |
| $n_j(x)$ | Numerical charge density at $x = x$, meter$^{-3}$ |
| $n_p$ | Number of electronic charges attained by particle in ionizing section, dimensionless |
| $n_s$ | Saturation charge per particle, dimensionless |
| $q$ | Particle dielectric constant, dimensionless |
| $R$ | Collector radius, meters |
| $u_x$ | Axial flow velocity in collector, meters/second |
| $x$ | Variable denoting position along collector axis, meters |
| $\alpha$ | Weight ratio of particles to gas, dimensionless |
| $\Delta$ | Fraction of saturation charge attained by particle, dimensionless |
| $\epsilon_o$ | Permittivity of free space, farads/meter |
| $\eta$ | Gas viscosity, kilogram/meter-second |
| $\rho$ | Gas density, kilogram/meter$^3$ |
| $\lambda$ | Charge attenuation length, meters |

For a cylindrical collector section L meters long, the numerical charge density, $n_j(L)$, in a mixture of flowing dust and gas at the collector outlet is related to the numerical charge density, $n_j(o)$, at the collector inlet by the equation:

$$n_j(L) = \frac{n_j(0)}{1 + L/\lambda} \quad (1)$$

where $\lambda$ is defined as the charge attenuation length. This characteristic length is related to the collector geometry and particle properties by the equation:

$$\lambda = \frac{u_x \epsilon_0}{k_j e n_j(0)} \quad (2)$$

where $u_x$ is the axial flow velocity, $\epsilon_0$ is the permittivity of free space, $k_j$ is the particle mobility, and e is the electronic charge. If the formation of an insulating dust layer on the collector is prevented, and gas velocity is high enough for the particles to strike the collector wall, discharge, and rebound into the gas stream, the amount of charge deposited by the particles on the collector walls is proportional to the dust content of the gas. Previously, this EGD principle has been applied to a single collector electrode. By extending this theory, it is possible, for dust particles of uniform size, to relate the four collector current values $I_1-I_4$, shown in FIG. 1, to the particle size and weight flow of dust in the gas stream.

Referring to FIG. 2, the charge density for any value of $x$ along the length of the collector section is found by replacing L in equation (1) by $x$, or:

$$n_j(x) = \frac{n_j(0)}{1 + \frac{k_j e n_j(0)}{u_x \epsilon_0} \cdot x} \quad (3)$$

Based upon current continuity, the net axial current loss in the stream from a position $x$ to $x + dx$ equals the net radial current through the sides of a cylinder of length dx, or:

$$\pi R^2 e u_x d [n_j(x)] = -2\pi R e k_j E_R n_j(x) dx$$

Thus, the current to the collector wall of length dx is:

$$dI(x) = 2\pi R e k_j E_R n_j(x) dx \quad (4)$$

In the ionizing section 16 of the monitor 10 shown in FIG. 1, the dust particles 18 are each charge toward a saturation value $n_s$. The number of electronic charges, $n_p$, attained by each particle depends upon its residence time in the ionizing section and upon the charging time constant. For particles larger than approximately 0.7 microns, the particle size anticipated in practical application, the saturation charge per particle, $n_s$, is given by the relation:

$$n_s = \frac{4\pi \epsilon_0 a^2 E_c}{e} \cdot \left[1 + 2 \frac{q-1}{q+2}\right] \quad (5)$$

When the ionizing section is sufficiently long, the residence time is long enough for all particles to attain approximately the same fraction of their saturation charge value. That is:

$$n_p = \Delta n_s \quad (6)$$

where $\Delta$ is a constant with a value slightly less than one for all particles larger than 0.7 microns. For a constant ionizing potential:

$$n_s = C_1 a^2 \quad (7)$$

Then:

$$n_p = C_2 a^2 \quad (8)$$

from equation (5), (6), and (7) where $C_1$ and $C_2$ are constants. Substituting particle mobility, numerical charge density and electric field expressions:

$$k_j = \frac{n_p e}{6\pi \eta a} \quad (9)$$

$$n_j(0) = \frac{3 n_p \alpha \rho}{4\pi a^3 d} \quad (10)$$

$$E_R = \frac{e n_j(x)(2R)}{4\epsilon_0} \quad (11)$$

and also equation (3) and equation (8) into equation (4), the following equation is obtained:

$$dI(x) = \frac{18\pi R^2 \Delta^3 E_c^3 a^2 \rho^2 \epsilon_0^3 \left[1 + 2 \frac{q-1}{q+2}\right]^3 \frac{dx}{a d}}{\left[1 + \frac{2\Delta^2 E_c^2 \alpha \rho \epsilon_0 \left[1 + 2\frac{q-1}{q+2}\right]^2}{\eta u_x d} \cdot x\right]^2} \quad (12)$$

Assuming that only $\alpha$ and $a$ are variables, equation (12) becomes:

$$dI(x) = \frac{c_3 \alpha^2 \frac{1}{a} dx}{(1 + C_4 \alpha x)^2} \quad (13)$$

where $C_3$ and $C_4$ are constants. Referring to FIG. 2, by integrating equation (13) over the collector segment length, the current flowing from a given collector segment is:

$$I_i = \int_{x_{i-1}}^{x_i} -1_{x_{i-1}} dI(x), \text{ where } i = 1, 2, 3, 4, \quad (14)$$

or $$I_i = \frac{C_3 \alpha^2}{a} \frac{(x_i - x_{i-1})}{(1 + C_4 \alpha x_i)(1 + C_4 \alpha x_{i-1})}$$

Assuming that dust particle and gas velocities are the same, from equation (14) for fixed gas velocity, the current from a given collector segment is proportional to the weight ratio of particles to gas, the particle radius, the collector segment length, and the position of the segment along the collector axis. Therefore, any one of these quantities can be determined from a knowledge of the others. In practical applications, both the weight ratio, $\alpha$, and the particle radius, $a$, are generally unknown. By substituting the current values from any two collector segments into similar expressions of equation (14), a set of two equations with two unknowns is formed with a solution yielding the weight ratio, $\alpha$, and the particle radius, $a$. Through use of four currents to solve four equations instead of just two, the accuracy of the solution, and therefore, operation of the monitor itself is enhanced.

In some practical applications, the dust-gas mixture contains a range of particle sizes. Under these conditions the superposition of segment currents given by equation (14) is invalid. For these cases, calibration of the system is based upon factorially designed experiments by which interactions between variables are accounted for. A suitable calibration experiment is obtained in Table I and II:

TABLE I

Design of the experiment

| Factors | Symbols | −1 | 0 | +1 |
|---|---|---|---|---|
| Dust flow (gm/hr) | $X_1$ | 2.0 | 8.0 | 14.0 |
| Dust mean size (microns) | $X_2$ | 43.1 | 104.3 | 143.5 |

TABLE II

Treatment combinations

| Run | Response, picoamperes | | | | Treatment combinations* | |
|---|---|---|---|---|---|---|
| | $I_1$ | $I_2$ | $I_3$ | $I_4$ | $X_1$ | $X_2$ |
| 1 | 42.5 | 84.0 | 29.5 | 27.5 | −1 | −1.36 |
| 2 | 11.8 | 10.8 | 11.2 | 4.20 | −1 | 0 |
| 3 | 9.50 | 7.60 | 6.20 | 3.70 | −1 | +0.82 |
| 4 | 330. | 470. | 168. | 120. | 0 | −1.36 |
| 5 | 62.0 | 48.0 | 41.0 | 19.0 | 0 | 0 |
| 6 | 51.0 | 35.0 | 29.0 | 16.0 | 0 | +0.87 |
| 7 | 560. | 800. | 275. | 230. | +1 | −1.36 |
| 8 | 106. | 70.0 | 63.0 | 34.0 | +1 | 0 |
| 9 | 80.0 | 56.5 | 45.5 | 28.8 | +1 | +0.87 |

| | | | | | |
|---|---|---|---|---|---|
| 10 | 77.0 | 94.0 | 37.0 | 18.2 | −1 | −1.36 |
| 11 | 25.0 | 15.6 | 13.4 | 5.50 | −1 | 0 |
| 12 | 13.7 | 13.8 | 11.4 | 6.40 | −1 | +0.87 |
| 13 | 230. | 328. | 130. | 90.0 | 0 | −1.36 |
| 14 | 54.0 | 43.0 | 39.5 | 19.8 | 0 | 0 |
| 15 | 43.0 | 30.0 | 23.0 | 15.5 | 0 | +0.87 |
| 16 | 525. | 685. | 265. | 205. | +1 | −1.36 |
| 17 | 110. | 81.5 | 71.5 | 37.0 | +1 | 0 |
| 18 | 86.0 | 62.0 | 42.0 | 26.5 | +1 | +0.87 |

*Tests run in random order.

Dust flow rate and particle size are the variables used in the experiment. The coding equations are:

$$X_1 = \frac{\text{Dust flow rate} - 8.0}{6} \quad (15)$$

$$X = \frac{\text{Dust mean size} - 104.3}{45.0} \quad (16)$$

Currents are measured sequentially at each of the nine levels with a constant gas flow rate. The values of $X_2$ from equation (16) for three test dust sizes are shown in Table II. Also in Table II, the response surfaces $I_1 = f_1(X_1, X_2)$ $I_2 = f_2(X_1, X_2)$, $I_3 = f_3(X_1, X_2)$ and $I_4 = f_4(X_1, X_2)$ are obtained using the results of the experiments to fit second degree equations subject to a least square error fit. The basic equation is:

$$I_i = b_o + b_1 X_1 + b_2 X_2 + b_{11} X_1^2 + b_{22} X_2^2 + b_{12} X_1 X_2 \quad (17)$$

The equations developed are shown in Table III:

TABLE III

Coefficient of segment current equations in terms of dust size and dust rate

Corresponding segment currents given in picoamperes
Coefficient

| | $I_1$ | $I_2$ | $I_3$ | $I_4$ |
|---|---|---|---|---|
| $b_o$ | 49.3 | 35.9 | 22.5 | 14.4 |
| $b_1$ | 80.1 | 95.2 | 39.9 | 31.3 |
| $b_2$ | −63.4 | −101.9 | −33.4 | −26.0 |
| $b_{11}$ | 18.3 | 13.5 | 26.0 | 8.3 |
| $b_{22}$ | 78.9 | 122.2 | 35.2 | 32.3 |
| $b_{12}$ | −108.4 | −151.8 | −54.1 | 43.9 |

To test calibration of the dust monitor, three size fractions at several dust flow rates are passed in turn through the monitor with the gas flow held constant, a suitable flow rate being 3.5 scfm. The values of $I_1$ plus $I_2$, and $I_3$ plus $I_4$ are then measured. Determination of the values of two unknown quantities requires two equations in terms of the unknown variables. The empirical equations shown in Table III are combined into $I_1$ plus $I_2$, and $I_3$ plus $I_4$, and the equations are solved simultaneously for $X_1$ and $X_2$ at the measured values of $I_1$ plus $I_2$, and $I_3$ plus $I_4$. Sample results are shown in Table IV:

TABLE IV

Tests of Calibration

| | Dust mean size, microns | | | Dust rate, gm/hr | | |
|---|---|---|---|---|---|---|
| Sample No. | True value | Measured value | Error, pct. | True value | Measured value | Error, pct. |
| 1 | 87.2 | 69.7 | −20 | 6.5 | 4.5 | −40 |
| 2 | 63.6 | 55.2 | −13 | 11.0 | 2.76 | −75 |
| 3 | 53.3 | 50.2 | −6 | 9.0 | 1.4 | −85 |
| 4 | 53.3 | 56.7 | +6 | 4.0 | 2.45 | −39 |
| 5 | 87.2 | 72.0 | −17 | 4.0 | 4.5 | +13 |

The solution of the equations produces two sets of dust size and rate values for each test. The values in Table IV are selected as those lying within the size and rate calibration ranges. The other sets of values are outside of these ranges and are rejected.

In one embodiment of EGD dust monitor 10 the following design parameters are successfully employed. Conducting electrode 30 is a 0.35 inch diameter by 3 inch long brass cylinder, and electrode 37 is a 4-mil tungsten wire. A high voltage source 24 supplies 390 microamperes to ionizing section 16 through current limiting network 36 so that voltage across the ionizing section is held at 4 kilovolts. A gas velocity of 30.4 meters per second through the ionizing section prevents dust precipitation. Velocity of the mixture at the diffuser outlet is reduced to 1.8 meters per second for entrance into the collector section 22. Each conducting collector segment 38–44 is a 3.625 inch long by 1.45 inch diameter brass tube, and each insulating segment 46–50 is a 0.25 inch long lucite ring.

While this invention has been described by reference to a specific preferred embodiment, equivalent forms of the invention will be obvious to skilled workers in the art. For example, the four segment collector, by proper calibration, might be used to measure two dust sizes and two gas flow rates at one time by simultaneous solution of four collector current equations (14) for four unknowns. Modification of the monitor itself according to well known design principles for EGD systems is also expected. For these reasons, this invention should be limited only by the scope of the following claims:

We claim:

1. In an electrogasdynamic dust monitor having means to charge particles suspended in a gaseous stream, means to collect the charge at a downstream location, and means to measure the rate at which charge is collected, the improvement comprising:
   a collector section operating as the means to collect and formed from electrically independent segments of conducting material arranged in series along the gaseous stream downstream from the means to charge, with each segment froming an outer bound for the gaseous stream, whereby charges from the particles are collected on the separate conducting segments at varying distances from the means to charge, and
   means for independently measuring the rate at which charge is collected on each conducting segment.

2. An electrogasdynamic dust monitor as claimed in claim 1 in which: the collector section comprises at least two segments.

3. An electrogasdynamic dust monitor as claimed in claim 1 in which: the collector section comprises at least four segments.

4. An electrogasdynamic dust monitor as claimed in claim 1 in which:
   the length of the conducting segments is substantially greater than the serial distance between them.

5. An electrogasdynamic dust monitor as claimed in claim 4 in which: the collector section comprises at least two segments.

6. An electrogasdynamic dust monitor as claimed in claim 4 in which: the collector section comprises at least four segments.

7. A method for measuring the properties of particles entrained in a flowing gas stream comprising:
   charging the particles with a unipolar charge,
   collecting the charge from the particles at a downstream location on a plurality of electrically independent collector segments positioned serially along the gaseous stream,
   independently measuring the rate at which charge is collected on each collector segment by measuring a separate electrical collector current flowing from each collector segment,
   assigning each of the plurality of collector segments and the collector current flowing from the corresponding collector segment a similar reference numeral $i$, where $i = 1, 2, 3, \ldots, n$ for a plurality of n collector segments, forming for each collector current, $I_i$, an equation based upon the expression:

$$I_i = \frac{C_3 \alpha^2}{a} \cdot \frac{(x_i - x_{i-1})}{(1 + C_4 \alpha x_i)(1 + C_4 \alpha x_{i-1})}$$

where "$\alpha$" is the weight ratio of particles to gas, $a$ is the particle radius in meters, $(x_i - x_{i-1})$ is the length in meters of the ($i$) collector segment from the upstream end of the series of collector segments, and $C_3$ and $C_4$ are calibration constants, and solving the resultant set of equations for the unknown values.

8. A method for measuring particles entrained in a flowing gas stream, as claimed in claim 3, further comprising:
assigning each of the plurality of collector segments and the collector current generated by the corresponding collector segment a similar numerical value $i$, where $i = 1, 2, 3, \ldots, n$ for a plurality of $n$ collector segments, forming for each collector current, $I_i$, an equation based upon the expression:

$$I_i = \frac{C_3 \alpha^2}{a} \cdot \frac{(x_i - x_{i-1})}{(1 + C_4 \alpha x_i)(1 + C_4 \alpha x_{i-1})}$$

where $\alpha$ is the weight ratio of particles to gas, $a$ is the particle radius in meters, $(x_1 - x_{i-1})$ is the length in meters of the ($i$) collector segment from the upstream end of the series of collector segments, and $C_3$ and $C_4$ are calibration constants, and
solving the resultant set of equations for the unknown values.

9. A method for measuring particles entrained in a flowing gas stream, as claimed in claim 7, in which:
the unknown values are $\alpha$, the weight ratio of the particles to gas, and $a$, the radius of the particles in meters, and
the number of currents measured and equations formed and solved is at least two.

* * * * *